(12) United States Patent
Göhring et al.

(10) Patent No.: US 11,813,620 B2
(45) Date of Patent: Nov. 14, 2023

(54) METHOD OF OPERATING A HAND-HELD SPRAY DEVICE AND HAND-HELD SPRAY DEVICE

(71) Applicant: J. Wagner GmbH, Markdorf (DE)

(72) Inventors: Alfred Göhring, Salem (DE); Jan Barthelmes, Salem (DE); Thomas Jeltsch, Friedrichshafen (DE)

(73) Assignee: J. Wagner GmbH, Markdorf (DE)

( * ) Notice: Subject to any disclaimer, the term of this patent is extended or adjusted under 35 U.S.C. 154(b) by 333 days.

(21) Appl. No.: 16/898,841

(22) Filed: Jun. 11, 2020

(65) Prior Publication Data
US 2020/0398293 A1 Dec. 24, 2020

Related U.S. Application Data

(63) Continuation of application No. PCT/EP2018/080998, filed on Nov. 13, 2018.

(30) Foreign Application Priority Data

Dec. 14, 2017 (DE) .................... 10 2017 130 003.1

(51) Int. Cl.
*B05B 1/14* (2006.01)
*B05B 3/02* (2006.01)
(Continued)

(52) U.S. Cl.
CPC ............... *B05B 1/14* (2013.01); *B05B 3/025* (2013.01); *B05B 5/025* (2013.01); *B05B 5/10* (2013.01); *B05B 7/02* (2013.01)

(58) Field of Classification Search
CPC ........... B05B 1/14; B05B 3/025; B05B 5/025; B05B 5/10; B05B 7/02
See application file for complete search history.

(56) References Cited

U.S. PATENT DOCUMENTS 11,193,767 B1\* 12/2021 Olsson .................... B05B 12/04
2013/0257984 A1 10/2013 Beier et al.
2017/0203318 A1\* 7/2017 Vähänen .............. B25J 17/0283

FOREIGN PATENT DOCUMENTS

EP 1 795 315 A1 6/2007
EP 2 644 392 A2 10/2013
(Continued)

OTHER PUBLICATIONS

English translation of International Preliminary Report on Patentability (Chapter I) (Application No. PCT/EP2018/080998) dated Jun. 25, 2020 8 pages.
(Continued)

*Primary Examiner* — Steven M Cernoch
(74) *Attorney, Agent, or Firm* — BURR PATENT LAW, PLLC

(57) ABSTRACT

A method for operating a hand-held spray device, wherein in a first step a target orientation of the spray nozzle relative to the operator control unit is defined, and wherein during operation a rotation of the spray device, brought about by manual movement of the spray, through a z swinging angle, about a z axis which is orthogonal with respect to the longitudinal axis and/or through a y swinging angle about a y axis which is orthogonal with respect to the longitudinal axis and orthogonal with respect to the z axis, by a single sensor and wherein the z swinging angle and/or the y swinging angle engage as interference variables in a closed-loop control circuit and make available closed-loop control variables in such a way that the spray nozzle retains its target orientation by means of closed-loop control of the swinging mechanism.

11 Claims, 5 Drawing Sheets

(51) Int. Cl.
     *B05B 5/025*     (2006.01)
     *B05B 5/10*     (2006.01)
     *B05B 7/02*     (2006.01)

(56) References Cited

FOREIGN PATENT DOCUMENTS

| | | | | |
|---|---|---|---|---|
| JP | 2004-050356 A1 | 2/2004 | | |
| KR | 20140090529 A | * | 7/2014 | ............... B05B 7/02 |
| WO | 2016/009112 A1 | 1/2016 | | |

OTHER PUBLICATIONS

International Search Report and Written Opinion (Application No. PCT/EP2018/080998) dated Feb. 21, 2019.

* cited by examiner

METHOD OF OPERATING A HAND-HELD SPRAY DEVICE AND HAND-HELD SPRAY DEVICE

CROSS REFERENCE TO RELATED APPLICATIONS

This application is a continuation of International Application No. PCT/EP2018/080998 filed Nov. 13, 2018, which designated the United States, and claims the benefit under 35 USC § 119(a)-(d) of German Application No. 10 2017 130 003.1 filed Dec. 14, 2017, the entireties of which are incorporated herein by reference.

FIELD OF THE INVENTION

The present invention relates to a method for operating a hand-held spray device and to a hand-held spray device.

BACKGROUND OF THE INVENTION

WO 2016/009112 A1 discloses a method for operating a hand-held spray device and a hand-held spray device, wherein an orientation of a spray nozzle of a spray head of the spray device with respect to an operator control unit is controlled and changed, wherein the spray device comprises the spray head, the operator control unit, the connecting mechanism which connects the spray head and the operator control unit, and at least one swinging mechanism which is arranged between the spray head and the connecting mechanism, wherein the spray head comprises the spray nozzle, and wherein the connecting mechanism defines a longitudinal axis of the spray device.

SUMMARY OF THE INVENTION

The present invention is based on the object of proposing a method for operating a hand-held spray device and a hand-held spray device which make available a maximum variety of functions with minimum technical complexity.

In the method according to the present invention for operating a hand-held spray device, there is provision that in a first step a target orientation of the spray nozzle relative to the operator control unit is defined, and in that during operation a rotation of the spray device, brought about by manual movement of the spray device through a z swinging angle ($\gamma$) about a z axis which is orthogonal with respect to the longitudinal axis and/or through a y swinging angle ($\beta$) about a y axis which is orthogonal with respect to the longitudinal axis and orthogonal with respect to the z axis, by a single sensor, preferably a gyro sensor, in particular by a multi-axis gyro sensor, and preferably by a two-axis gyro sensor or a three-axis gyro sensor, and in that the z swinging angle ($\gamma$) and/or the y swinging angle ($\beta$) engage as interference variables in a closed-loop control circuit and make available closed-loop control variables in such a way that the spray nozzle retains its target orientation by means of closed-loop control of the swinging mechanism. By virtue of the use of just a single sensor, the spray device is technically simple and therefore cost-effective. By virtue of the exclusive evaluation of a z swinging angle and of a y swinging angle, it is possible to use the spray device to spray both walls and ceilings as well as floors and surfaces of sloping roofs without further sensors being necessary for this, since the sensor data is used to control the spray device or the spray nozzle solely with reference to the longitudinal axis of the spray device, independently of an orientation of the z axis and of the y axis with the specific reference system and, in particular, with a horizontal and a perpendicular of the space.

Furthermore, there is provision that only rotational angle data of the single sensor are processed as interference variables by a control device in order to control the orientation of the spray nozzle in such a way that on the basis thereof the closed-loop control variables for the orientation of the spray nozzle is implemented in space as a reaction to the rotation of the spray device, brought about by manual movement, by means of the at least one swinging mechanism controlled by the control device, in such a way that the spray nozzle is continuously adjusted to its target orientation which it had assumed before the rotation of the spray device was brought about by manual movement, and for this purpose the spray nozzle is swung through a w swinging angle ($\gamma'$), opposed to the z swinging angle ($\gamma$), about a swinging mechanism axis w and/or through a v swinging angle ($\beta'$), opposed to the y swinging angle ($\beta$), about a swinging mechanism axis v. As a result, it is possible on the basis of the interference variables detected by the single sensor to make available closed-loop control variables for the at least one swinging drive, by means of which variables an orientation which results from movement of the spray device and differs from a desired orientation of the spray nozzle with respect to a surface can be equalized so that the desired orientation of the spray nozzle with respect to the surface is maintained.

There is also provision that by means of further rotational angle data of the single sensor, which represent further interference variables, a rotation of the spray device through an x swinging angle ($\alpha$) about an x axis, which is defined by the longitudinal axis of the connecting mechanism is also detected, and in that rotational angle data of the single sensor, detected with respect to the x axis, is processed by the control device as further closed-loop control variables in order to control the orientation of the spray nozzle, wherein in such a way that on the basis thereof either the orientation of the spray nozzle in space is carried out as a reaction to the rotation of the spray device, brought about by manual movement, by means of the at least one swinging mechanism which is automatically controlled by the control device, in such a way that the spray nozzle is continuously adjusted to a target orientation which it had assumed before the rotation of the spray device was brought about by manual movement, and for this purpose the spray nozzle is swung through a u swinging angle ($\alpha'$), opposed to the x swinging angle ($\alpha$), about a swinging mechanism axis u, or a switching command is generated by which the spray device is deactivated or activated in accordance with the command or is defined or programmed to a target orientation. As a result, on the one hand, it is possible to compensate an undesired rotation of the spray device about its longitudinal axis, such as can occur e.g. in particular when a user pivots the spray device a long way to the left or to the right in front of a perpendicular wall. This is particularly advantageous if a flat jet is being used for the work and the intention is to spray up to a vertical edge. On the other hand, it is as a result possible to convey commands to the control device of the spray device without requiring pushbutton keys for this. Therefore, e.g. turning the spray device to the left by its longitudinal axis through more than 30° can be defined as a signal to activate the spraying operation, and turning the spray device to the right about its longitudinal axis through more than 30° can be defined as a signal to deactivate the spraying operation. In this context, there is also provision that a signal to activate or deactivate is generated only if a rotational speed, specified as the threshold value about the longitudinal axis is reached. As a result, despite this function, slow swinging of the spray device about its longitudinal axis is possible.

In order to define an orientation of the spray nozzle, there is provision that at the start of operation the control device of the spray device is programmed in such a way that the home position of the spray device, which is detected by the sensor is defined as the target orientation of the spray nozzle and in this context either the spray nozzle is positioned, by means of the at least one actuating mechanism, in central rotational positions with respect to a rotation about the w swinging mechanism axis and the v swinging mechanism axis and, in particular, also with respect to a rotation about the u swinging mechanism axis, in such a way that the target orientation is orientated parallel to the longitudinal axis which is defined by the connecting mechanism, or the spray nozzle is positioned, by means of the at least one actuating mechanism, into a special rotational position with respect to a rotation about the w swinging mechanism axis and/or the v swinging mechanism axis and/or the u swinging mechanism axis, wherein the special rotational position deviates, with respect to at least one of the swinging mechanism axes from a central rotational position or from the longitudinal axis defined by the connecting mechanism. As a result an orientation of the spray nozzle with the central rotational position, all that is necessary for a user to prepare a spraying process is to orientate the spray device with its longitudinal axis orthogonally with respect to the surface to be sprayed, which is embodied e.g. as a wall, floor, ceiling or surface of a sloping roof. As a result, during movements of the user with which the user swings the spray device to the left and to the right as well as up and down, e.g. before a perpendicular wall, the spray nozzle is respectively swung in the opposite direction for the purpose of compensation in such a way that the spray nozzle remains orientated in a continuously orthogonal fashion with its spray axis with respect to the surface to be sprayed, and therefore undesired oblique spraying on of the paint is avoided. As a result of the orientation of the spray nozzle with a special rotational position, it is possible for a user to spray even surfaces which are difficult to access, since the spray device can be used as a folding arm. In this way, the spray device is orientated in a special rotational position in such a way that the spray nozzle deviates with its spraying direction from the longitudinal axis of the spray device by virtue of rotation about at least one of the three counter-swinging axes u, v and w.

Furthermore, there is provision that the first step also comprises orientating the spray nozzle with a surface which is to be sprayed, at an angle which is provided for the spraying of the surface, and, in particular, orthogonally orientating the spray nozzle with respect to the surface which is to be sprayed, and/or in that the definition of the orientation of the spray nozzle to the longitudinal axis is triggered either by an electrical signal, which is generated by means of a sensing device present on the spray device, or by an acoustic signal, which is picked up by a microphone assigned to the spray device, or by a movement sequence, such as e.g. rapid forward and backward rotation about the x axis, which can be detected by the single sensor.

As a result, simple and intuitive specification of the orientation of the spraying nozzle is achieved, so that it becomes possible for a user simply and in a very short time to change between surfaces which are orientated differently in space, by virtue of the fact that the spray device is programmed with a new target orientation.

There is also provision that when the single sensor is arranged in the operator control unit, in the event of a change in the orientation of the operator control unit, the spray nozzle is adjusted in such a way that the programmed target orientation of the spray nozzle is retained independently of the changed orientation of the operator control unit. With such an arrangement, rotation of the spray device which is brought about by manual movement of the spray device can be easily detected by the single sensor, since the swinging axes of the spray device which is preferably gripped by a user with the first hand in the region of the operator control unit and with a second hand in the region of the connecting mechanism pass through the single sensor or in the vicinity of the single sensor. With such an arrangement, the single sensor is particularly well protected against soiling.

Alternatively, there is also provision that the single sensor is arranged in the region of the spray nozzle, wherein the single sensor is moved together with the spray nozzle by the at least one swinging mechanism, wherein the programmed target orientation of the spray nozzle is adjusted in a feedback loop in such a way that the programmed target orientation of the spray nozzle is retained independently of the changed orientation of the operator control unit. With such an arrangement, it is possible to maintain in a particularly precise fashion the orientation of the spray nozzle with respect to the surface to be sprayed, since closed-loop control of the target orientation takes place independently of interference influences such as e.g. sagging of a particularly long connecting mechanism.

Furthermore, there is provision that as a reaction to the manually brought-about rotation of the spray device either the spray nozzle is rotated through a u swinging angle ($\alpha'$) and/or v swinging angle ($\beta'$) and/or w swinging angle ($\gamma'$) which is the same in absolute value and opposed to the x swinging angle ($\alpha$) and/or y swinging angle ($\beta$) and/or z swinging angle ($\gamma$), or the spray nozzle is rotated, in accordance with a function which is preferably stored in the control device, through a u swinging angle ($\alpha'$) and/or v swinging angle ($\beta'$) and/or w swinging angle ($\gamma'$) which is larger or smaller in absolute value and opposed to the x swinging angle ($\alpha$) and/or y swinging angle ($\beta$) and/or z swinging angle ($\gamma$), or the spray nozzle is controlled, in accordance with a further function which is preferably stored in the control device in such a way the x swinging angle ($\alpha$) is assigned a u swinging angle ($\alpha'$) of 0° and/or the y swinging angle ($\beta$) is assigned a v swinging angle ($\beta'$) of 0° and/or the z swinging angle ($\gamma$) is assigned a w swinging angle ($\gamma'$) of 0°, so that the spray device is also used as an at least partially rigid, and in particular completely rigid, purely hand-held spray device. The first embodiment variant makes it possible to ensure a constant orientation of the spray nozzle with respect to the surface to be sprayed. The second embodiment variant makes it possible to keep the energy requirement for the at least one swinging mechanism to be kept as small as possible with swinging angles which are relatively small in terms of absolute value. By virtue of the second embodiment variant, it is possible to spray relatively large surfaces from one position, with swinging angles which are relatively large in terms of absolute value. The third embodiment variant makes it possible also to carry out the semi-automatic manual operation or a complete manual operation. The function which is stored in the control device preferably comprises a mathematical formula or a value table, in order to assign automatically to the swinging angles which are generated by the manual movement of the spray device corresponding counter-swinging angles which orientate the spray nozzle.

With the hand-held spray device according to the present invention, there is provision that the spray device comprises just a single sensor, specifically a gyro sensor, in particular a digital multi-axis gyro sensor, wherein the single sensor detects a z swinging angle ($\gamma$) about a z axis which is orthogonal with respect to a longitudinal axis which is defined by the connecting mechanism, wherein the single sensor detects a y swinging angle ($\beta$) about a y axis which is orthogonal with respect to the longitudinal axis defined by the connecting mechanism and orthogonal with respect to the z axis, and wherein the control device controls with this single sensor a manually brought-about change in an orientation of the spray nozzle in space with respect to a target orientation of the spray nozzle and corrects the change by means of at least one swinging mechanism arranged between the operator control unit and the spray nozzle, in such a way that the spray nozzle of the spray device is continuously adjusted to the target orientation which the spray nozzle had assumed before the manually brought-about rotation of the spray device. The use of only a single sensor makes the spray device technically simple and therefore cost-effective. By virtue of the exclusive evaluation of the z swinging angle and of a y swinging angle, it is possible to use the spray device to spray both walls and ceilings and floors as well as surfaces of sloping roofs without further sensors being necessary for this, since the sensor data is used to control the spray device or the spray nozzle solely with reference to the longitudinal axis of the spray device, independently of an orientation of the z axis and of the y axis for the specific reference system and, in particular, with a horizontal and a perpendicular of the space.

Furthermore, there is provision that the single sensor also detects an x swinging angle ($\alpha$) about an x axis, wherein the x axis is defined by the longitudinal axis of the connecting mechanism. As a result, on the one hand, it is possible to compensate an undesired rotation of the spray device about its longitudinal axis, such as can occur e.g. in particular, when a user swings the spray device a very long way to the left or to the right in front of a perpendicular wall. This is particularly advantageous if a flat jet is being used for the work and the intention is to spray up to a vertical edge. On the other hand, it is as a result possible to convey commands to the control device of the spray device without requiring pushbutton keys for this. Therefore, e.g. turning the spray device to the left by its longitudinal axis through more than 30° can be defined as a signal to activate the spraying operation, and turning the spray device to the right about its longitudinal axis through more than 30° can be defined as a signal to deactivate the spraying operation. In this context, there is also provision that a signal to activate or deactivate is generated only if a rotational speed, specified as the threshold value about the longitudinal axis is reached. As a result, despite this function, slow swinging of the spray device about its longitudinal axis is possible.

There is also provision that the single sensor is arranged on the operator control unit or on the spray head and, in particular, in the region of the spray nozzle thereof. With an arrangement on the operator control unit, a rotation of the spray device which is brought about by manual movement of the spray device can be easily detected by the single sensor, since the swinging axes of the spray device which is preferably gripped by a user with a first hand in the region of the operator control unit and with a second hand in the region of the connecting mechanism, passage of the single sensor or in the vicinity of the single sensor. With such an arrangement, the single sensor is particularly well protected against soiling. With an arrangement on the spray head and, in particular, on a spray nozzle thereof, the orientation of the spray nozzle with respect to the surface to be sprayed can be maintained particularly precisely since closed-loop control of the target orientation takes place independently of interference influences such as e.g. sagging of a particularly long connecting mechanism.

Furthermore, there is provision that the connecting mechanism can be telescoped manually or automatically, and/or in that the spray nozzle is embodied as a flat jet nozzle and, in particular, as a multi-purpose spray nozzle which can be switched between flat jet and round jet, in particular manually and/or automatically, and can rotate, in particular manually and/or automatically, in particular by means of at least one of the swinging mechanisms which are present or by means of a rotation mechanism which is present in addition to the swinging mechanism, at least in 90° increments about a spraying direction. By virtue of the telescoping property, it is possible to avoid the use of ladders and scaffolding in many applications, so that the expenditure is reduced. By means of a flat jet nozzle, edges of a surface which is to be sprayed can be sprayed in a more reliably targeted fashion. Automatic rotatability of the flat jet nozzle provides the abovementioned advantage for edges which can have any orientation or at least a horizontal or vertical orientation.

There is also provision that each swinging mechanism comprises at least one drive, in particular an electric or pneumatic drive, wherein the drive is embodied in particular as a rotary drive or linear drive, wherein the spray nozzle and/or the spray head and/or the connecting mechanism can be swung, in particular directly or indirectly, and/or rotated, in particular directly or indirectly, by means of the drive. Such drives have a low weight and their closed-loop control can be performed precisely and quickly.

Furthermore, there is provision that the spray nozzle or the spray head or the connecting mechanism can be swung out of a central rotational position by the swinging mechanism, wherein in the central rotational position the spray nozzle is positioned in such a way that the target orientation is orientated parallel to the longitudinal axis which is defined by the connecting mechanism, through a w swinging angle ($\gamma'$) by rotation about the z axis up to +/−30° or up to +/−45° or up to +/−180° or to an unlimited extent with left-hand rotation and right-hand rotation, and can be swung through a v swinging angle ($\beta'$) by rotation about the y axis up to +/−30° or up to +/−45°, or up to +/−180° or to an unlimited extent with left-handed rotation and right-handed rotation, and in particular can also be rotated through a u swinging angle ($\alpha'$) by rotation about the x axis up to +/−30° or up to +/−45° or up to +/−180° or to an unlimited extent with left-handed rotation and right-handed rotation.

By virtue of such a swinging property or rotating property, it is possible to compensate the manual movements of the user reliably.

Furthermore, the spray device is provided for hydraulic paint spraying and/or pneumatic paint spraying and/or electrostatic paint spraying. The hand-held spray device provides the abovementioned advantages for all types of paint spraying.

There is also provision that the spray device comprises a power supply for supplying energy to the control device and the at least one swinging mechanism, wherein the power supply comprises an energy store, wherein the energy store is embodied in particular as an electrical accumulator and is accommodated in particular in the operator control unit, and/or comprises a power line which is laid parallel to a paint hose or laid in a paint hose, and/or comprises an electrical generator, wherein the generator is driven in particular by an air flow fed to the spray device or by a paint flow fed to the spray device, in particular by means of a turbine. The requirements which are made in respect of free movability, low weight and long working cycles can be satisfied by such a power supply.

Finally, there is provision that the connecting mechanism comprises at least one lance tube, wherein the lance tube is embodied, in particular, with a lightweight design and is preferably embodied as a carbon fiber component or as a glass fiber component. This makes it possible to implement a paint spray device with low weight despite a large range and compact transportation dimensions.

According to the present invention, the term "control" is understood to include technical closed-loop monitoring and technical open-loop monitoring.

According to the present invention, the gyro sensor is embodied in particular as a MEMS gyro sensor, specifically as a micro-electromechanical system gyro sensor.

BRIEF DESCRIPTION OF THE DRAWINGS

Further details of the present invention are described in the drawing on the basis of schematically illustrated exemplary embodiments.

DETAILED DESCRIPTION OF THE INVENTION

Figure 1:
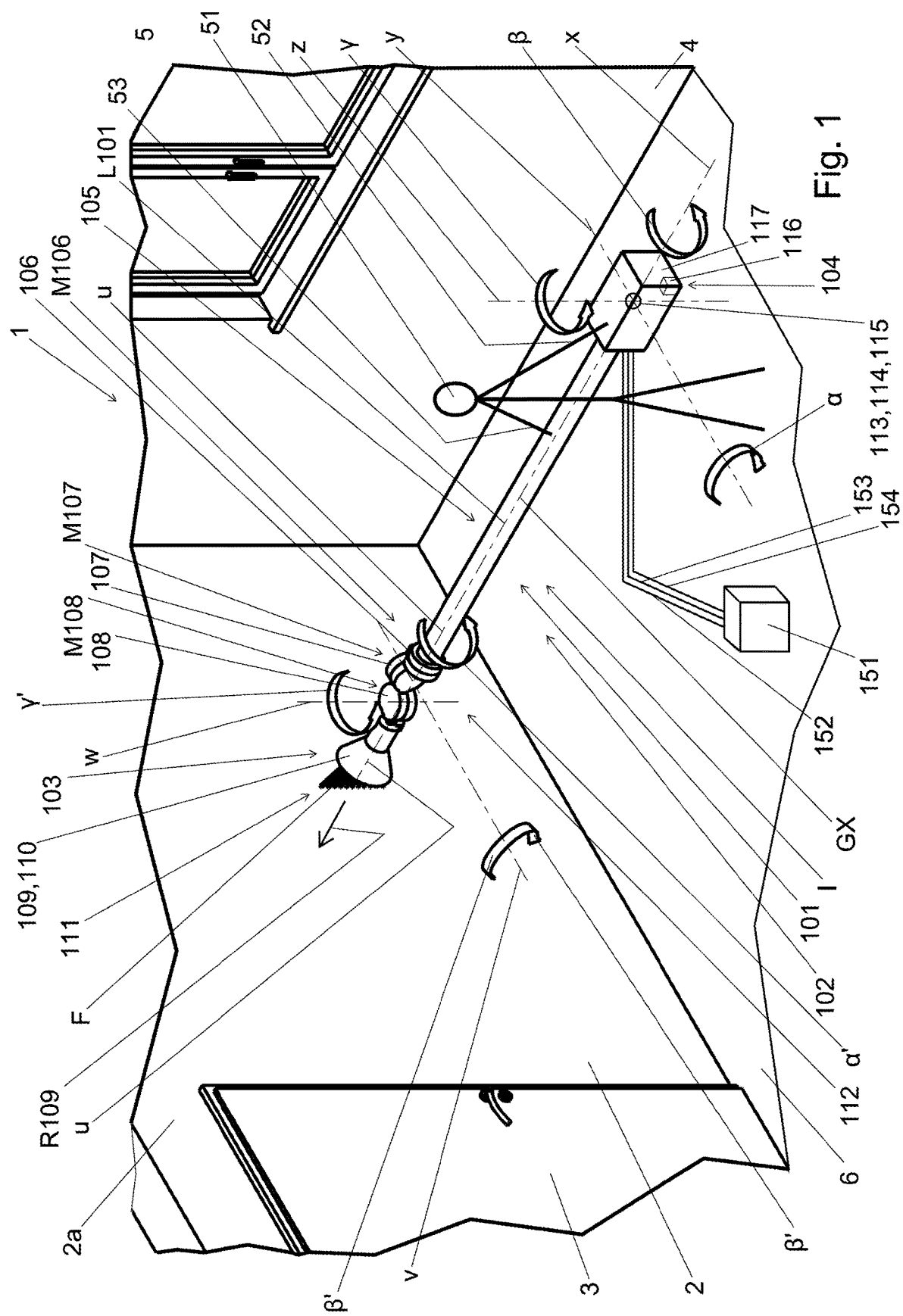
FIG. 1 shows a perspective view of a first space with a first embodiment variant of a hand-held spray device which is arranged therein and is held in a first position by a user.

FIG. 1 shows a perspective view of a first space 1 with a hand-held spray device 101 which is arranged therein. The spray device 101 is held in a first position I by a symbolically illustrated user 51.

The hand-held spray device 101 is embodied as a paint spray device 102. The spray device 101 comprises a spray head 103, an operator control unit 104 and a connecting mechanism 105 which connects the spray head 103 and the operator control unit 104. Furthermore, the spray device 101 comprises three swinging mechanisms 106, 107 and 108 which are arranged between the spray head 103 and the connecting mechanism 105. The spray head 103 comprises a spray nozzle 109, from which paint F emerges in a spraying direction R109. The spray nozzle 109 is embodied as a flat jet nozzle 110. As is apparent from FIG. 1, a flat jet 111 which is positioned vertically in the space 1 emerges from the flat jet nozzle 110. A longitudinal axis L101 of the spray device 101 is defined by the connecting mechanism 105. The spray device 101 is held by the user 51 with a first hand 52 on the operator control unit 104 and with a second hand 53 on the connecting mechanism 105.

The space 1 comprises a first, vertical wall 2 in which a door 3 is arranged, and adjoining the first wall 2 at a right angle a second vertical wall 4 in which a window 5 is arranged. Furthermore, the space 1 comprises a floor 6 on which the user 51 is standing, and parallel to the floor 6 a ceiling (not illustrated).

FIG. 1 shows a first step of a method for operating the hand-held spray device 101. In this first step, a target orientation 112 of the spray nozzle 109 or of the spraying direction R109 of the spray nozzle 109 relative to the operator control unit 104 is defined or programmed as a home position of the spray device 101. Of course, at this time no paint F is sprayed. In the first position I (shown in FIG. 1), the spray nozzle 109 is orientated toward the operator control unit 104 which is connected to the connecting mechanism 105, in such a way that the spraying direction R109 and the longitudinal axis L101 of the spray device 101 lie on a common straight line GX. This position is assumed by the spray nozzle 109 which is arranged on the spray head 103 when the u swinging mechanism 106, the v swinging mechanism 107 and the w swinging mechanism 108 are each in a central rotational position M106, M107, M108 or 0° rotational position.

In order to achieve an optimum spraying result or application of paint, the spray device 101 is to be orientated with respect to the first vertical wall 2 to be sprayed, in such a way that the spraying direction R109 is orthogonal with respect to a surface 2a of the first vertical wall 2, as is shown in FIG. 1.

In order to spray the surface 2a of the first vertical wall 2, the user 51 then pivots the spray device 101 through a swinging angle γ in the space 1 to the left and the right about a z axis, and through a swinging angle β upward and downward in the space 1 about a y axis. In this context, the z axis is orientated orthogonally with respect to the longitudinal axis L101 of the spray device 101. In this context, the y axis is orientated orthogonally with respect to the z axis and orthogonally with respect to the y axis.

A single sensor 113, which is embodied as a gyro sensor 114 with the design of a digital multi-axis gyro sensor 115 and is arranged in the operator control unit 104, detects the z swinging angle γ and the y swinging angle β. In a closed-loop control circuit 116, which is embodied in a control device 117 of the spray device 101, any change in the z swinging angle γ and in the y swinging angle β is detected as an interference variable, with respect to which the closed-loop control circuit 116 then makes available closed-loop control variables. By means of these closed-loop control variables, the w swinging mechanism 108 and the v swinging mechanism 107 are actuated to retain the orientation of the spraying direction R109 and are actuated with respect to the surface 2a of the wall 2 in order to retain an orthogonal orientation of the spraying direction R109 with respect to the surface 2a, in such a way that these bring about a counter-swinging movement of the spray head 103 or of the spray nozzle 109 through a w swinging angle γ' and through a v swinging angle β'. The spray device 101 also comprises a supply device 151, via which the spray nozzle 109 and the spray head 103 are supplied with paint via a hose 152 and optionally with atomizer air via a hose 153, and via which the operator control unit 104 is optionally supplied with electrical energy via a cable 154. The hose 151 or the hoses 151, 152 is/are led through the connecting mechanism 105 and past the swinging mechanisms 106, 107, 108 to the spray head 103 or the spray nozzle 109. According to one embodiment variant (not illustrated), there is also provision to integrate the supply device 151 completely or partially into the operator control unit and/or into the connecting mechanism 105.

For specific applications, in particular, the spraying of small surfaces, there is also provision to place the spray nozzle with all the swinging mechanisms in the central position and to stipulate to the closed-loop control that in each case the value 0° be specified for the counter-swinging angles independently of the detected swinging angles, so that a purely hand-held operation of the spray device is made possible. There is optionally also provision to activate adjustment to the target orientation only for one or two freely selectable swinging angles and thereby operate in a semi-automatic operating mode.

Figure 2:
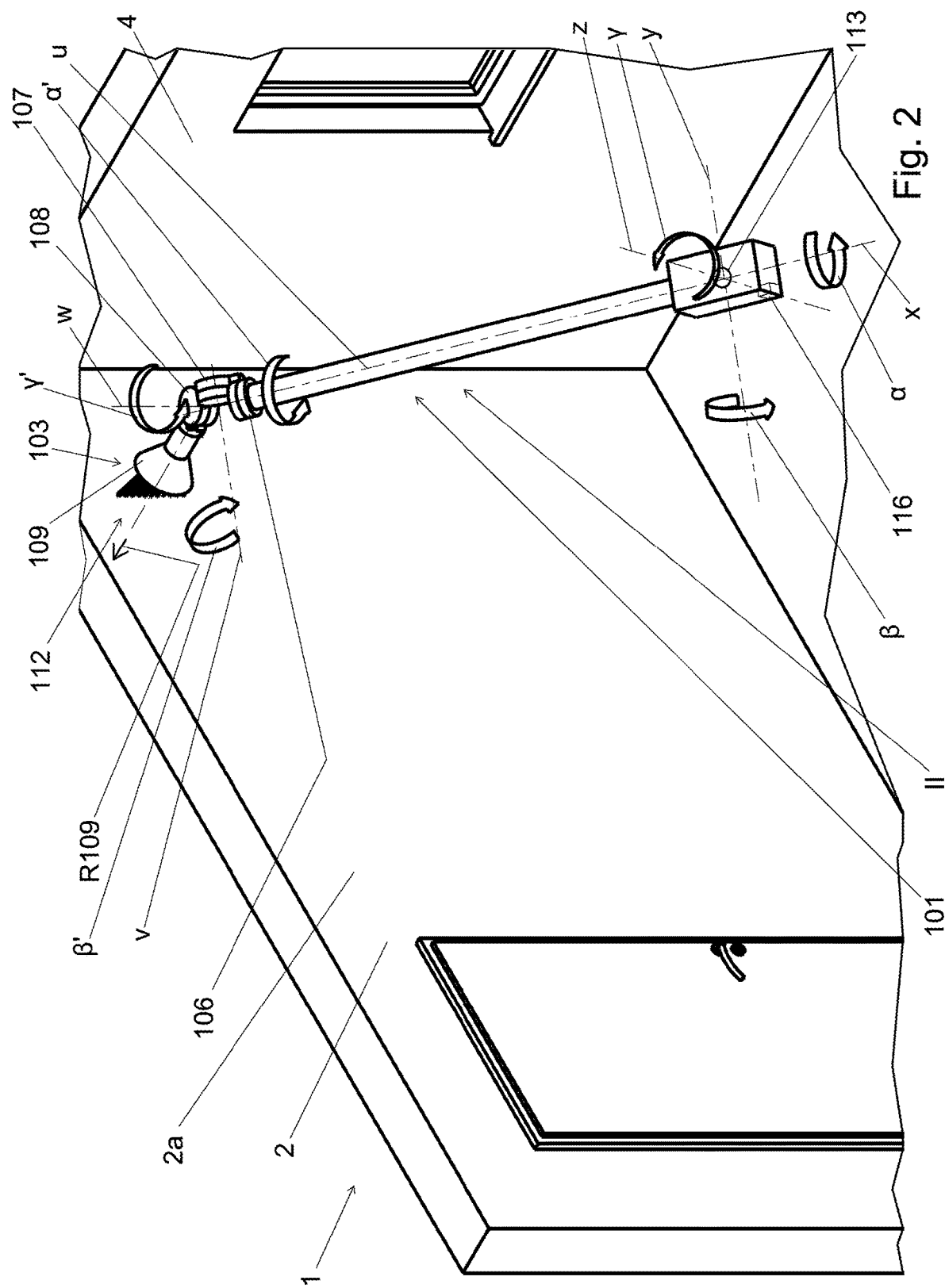
FIG. 2 shows a further perspective view of the first space and of the hand-held spray device, wherein the spray device is held in a second position by the user (not illustrated)

FIG. 2 illustrates a situation in which the spray device 101 has been pivoted by the user, who is not illustrated in FIG. 2 in order to maintain the clarity. FIG. 2 shows the spray device 101 which is known from FIG. 1, in a second position II in which it has been pivoted by the user out of the position I (see FIG. 1), both to the right about the z axis and upward about the axis. The closed-loop control circuit 116 has already actuated the v swinging mechanism 107 and the w swinging mechanism 108 during the movement, in such a way that corresponding counter-swinging movements have taken place about the v axis v of the v swinging mechanism 107 and about the w axis w of the w swinging mechanism 108, and the spray head 103 or the spray nozzle 109 has remained unchanged during the movement with its spraying direction R109, carried out by the user, and was, therefore, continuously orientated orthogonally with respect to the surface 2a of the wall 2. In the comparative view of FIGS. 1 and 2, the spray device 101 has been pivoted by the user 51 through the z angle γ to the right about the z axis and through a y angle β upward about the y axis. Correspondingly, the spray head 103 has been pivoted to the left with the spray nozzle 109 through a w angle γ' about the w axis of the w swinging mechanism 108, and has been pivoted through a v angle β' downward about the v axis of the v swinging mechanism 107.

The third swinging mechanism 106, which is embodied as an x swinging mechanism, is not necessary for the functional scope which has been described until now and could consequently be replaced by a rigid connection.

Since an xyz coordinate system in which the sensor 113 detects the user 51 acting on the spray device 101, and u, v and w axes about which the spray head 103 or the spray nozzle 109 can be pivoted with respect to the operator control unit 104 by means of the swinging mechanism 106, 107 and 108 are reference-free with respect to the space 1, in the way described, it is also possible to spray surfaces which have an orientation which deviates from the surface 2a of the wall 2 and which are formed, for example, by floors, ceilings or sloping roofs after a target orientation 112 of the spray nozzle 109 relative to the operator control unit 104 or the longitudinal axis L101 of the spray device 101 is specified and a corresponding home position is selected. In this context, defining or programming means that after a home position of the spray device with a desired target orientation 112 of the spray nozzle 109 has been established, the activity of the closed-loop control circuit 116 can be started in such a way that any swinging movement detected by the sensor 113, about the x axis and/or the y axis and/or the z axis brings about a counter-swinging movement of the spray nozzle 109, wherein the counter-swinging movement is carried out by the swinging means 106, 107, 108.

Figure 3:
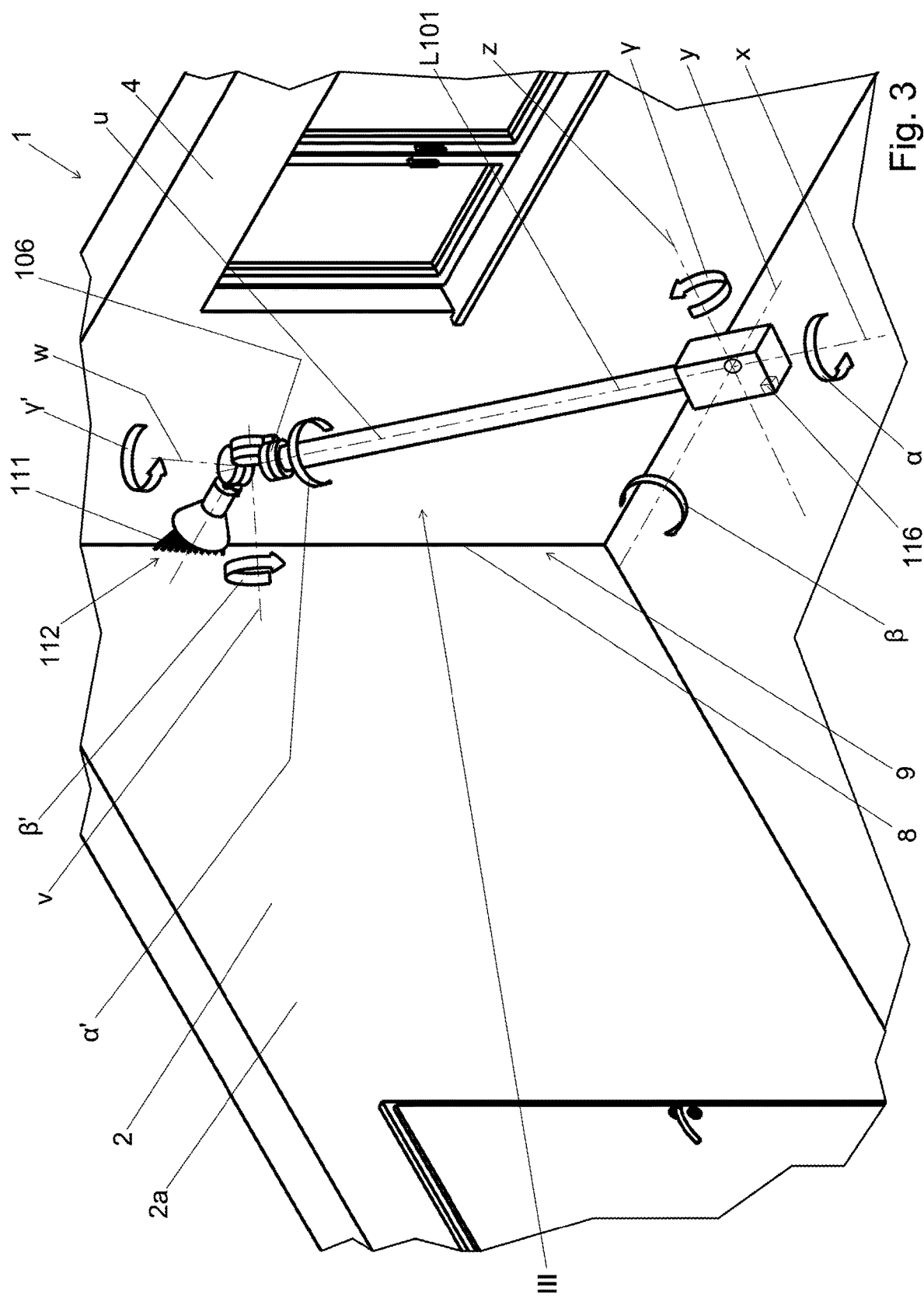
FIG. 3 shows a further perspective view of the first space and of the hand-held spray device, wherein the spray device is held in a third position by the user (not illustrated)

FIG. 3 illustrates again the arrangement which is known from FIGS. 1 and 2, wherein the spray device 101 is shown in a third position III, and for this purpose has not only been pivoted about the z axis and the y axis by the user (not illustrated in FIG. 3), but also about the x axis, so that the embodiment variant of the spray device 101 in which the device also comprises the x swinging means 106 will now be described. In order, in particular, also to be able to operate with the flat jet 111 cleanly on the surface 2a even in the region of an edge 8, as is formed e.g. in a junction region 9 between the two walls 2 and 4, a rotation of the spray device about the x axis through a swinging angle α is now also detected if a home position of the spray device 101 is defined or programmed in the form of a target orientation 112. In so far as this has taken place in the first position I of the spray device 101 which is shown in FIG. 1, the closed-loop control circuit 116 can now also compensate if the user rotates the spray device 101 through an x swinging angle α about the x axis. As shown in FIG. 3, the closed-loop control circuit 116 ensures that a counter-rotation about the u swinging angle α' takes place by means of the u swinging mechanism 106, so that the swinging of the spray device 101 about the x axis or its longitudinal axis L101, is brought about by the user, is equalized and the flat jet 111 retains its vertical orientation in the space 1, and the wall surface 2a can be sprayed cleanly up to the second vertical wall 4.

Figure 4:
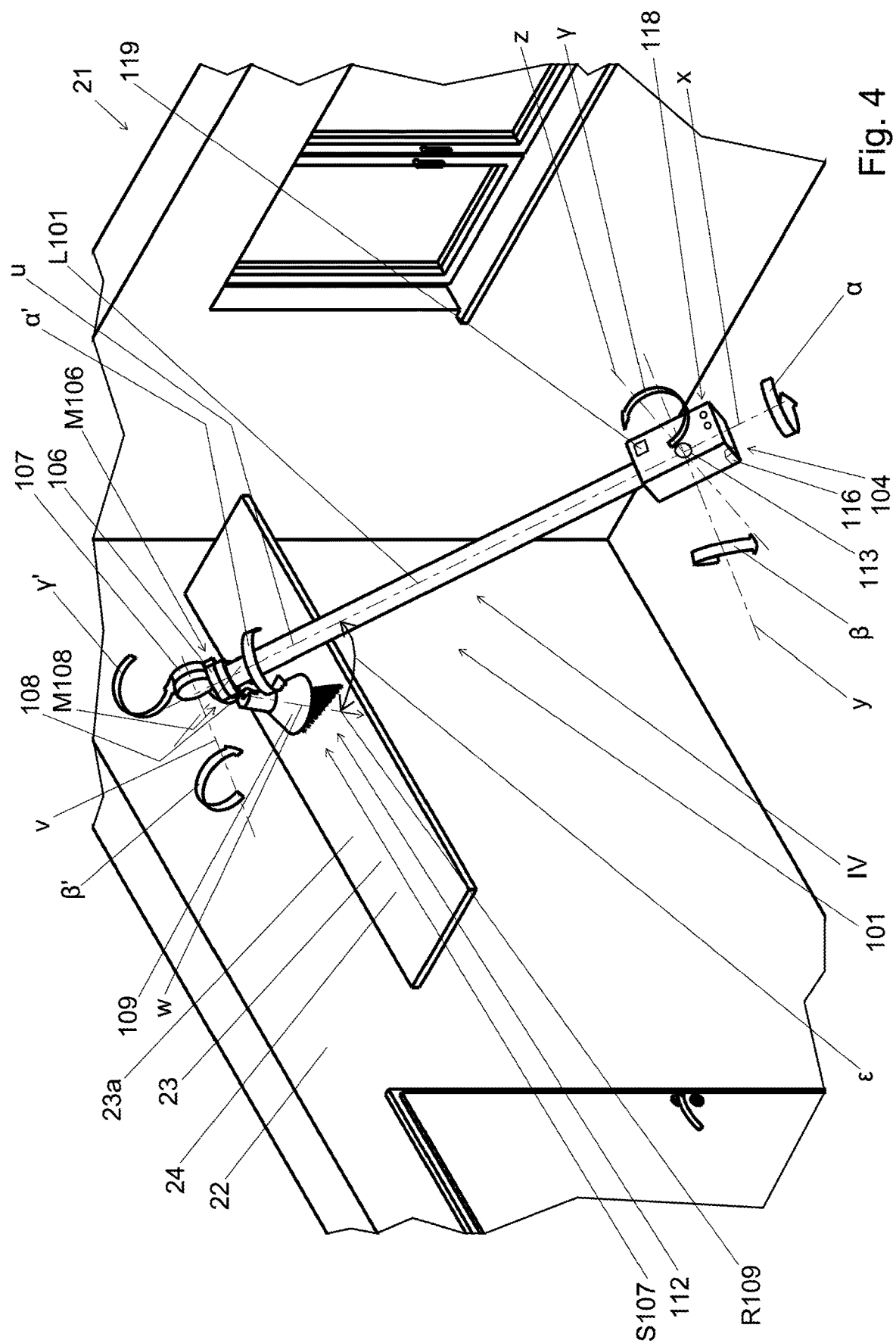
FIG. 4 shows a perspective view of a second space with hand-held spray device which is arranged therein and is known from FIGS. 1 to 3, wherein the spray device is held in a fourth position by the user (not illustrated)

FIG. 4 shows a perspective view of a second space 21 with the hand-guided spray device 101 arranged therein, which is known from FIGS. 1 to 3, wherein the spray device 101 is held in a fourth position IV by the user who is known from FIG. 1 and not illustrated in FIG. 4. The space 21 comprises a shelf floor 23, which is mounted on a first vertical wall 22 and whose upper side 23a forms a surface 24 which is provided for spraying. In a first step of the method for operating the hand-held spray device 101, the spray nozzle 109 now again receives a target orientation 112 relative to the operator control unit 104. Since the surface 24 is very difficult to access for the user without a ladder or scaffolding, the user pivots the v swinging mechanism 107 into a special rotational position S107 about the v axis using symbolically illustrated control buttons 118 arranged on the operator control unit 104, so that the spray nozzle 109 is positioned with its spraying direction R109 at a sharp angle ε with respect to the longitudinal axis L101 of the spray device 101. The u swinging mechanism 106 and the w swinging mechanism 108 remain in the central rotational positions M106, M108. The orientation of the spray nozzle 109 with respect to the operator control unit 104 is then specified as a target orientation 112. After this specification, swinging movements which are detected by the sensor 113, about the x axis x and/or y axis y and/or z axis z are detected as interference variables and converted into closed-loop control variables by the closed-loop control circuit 116, so that the specified target orientation 112 of the spray nozzle 109 is retained by closed-loop counter-control by means of the swinging mechanisms 106, 107 and 108. In order to obtain a good spraying pattern, there is also provision in the first step also to orientate the spray device 101 with respect to the surface 24 to be sprayed, so that the spraying direction R109 of the spray nozzle 109 is positioned at a desired angle and, in particular, orthogonally with respect to the surface 24 which is to be sprayed. Such a procedure makes it easier for the user to estimate a target orientation of the spray nozzle which is to be selected for the surface which is to be respectively sprayed. The operator control unit 104 also comprises an operator control means 119 which is shown only in FIG. 4 and by means of which the user can start, meter and terminate the paint flow and/or the spraying activity. This operator control mechanism 119 is preferably embodied as a trigger.

As an alternative to automatic operation during which the spray nozzle is always orientated toward the target orientation, a manual operating mode of the spray device is also provided in which the spray direction is operated in the specified special rotational position, without automatic adjustment of the orientation of the spray nozzle taking place during operation.

Figure 5:
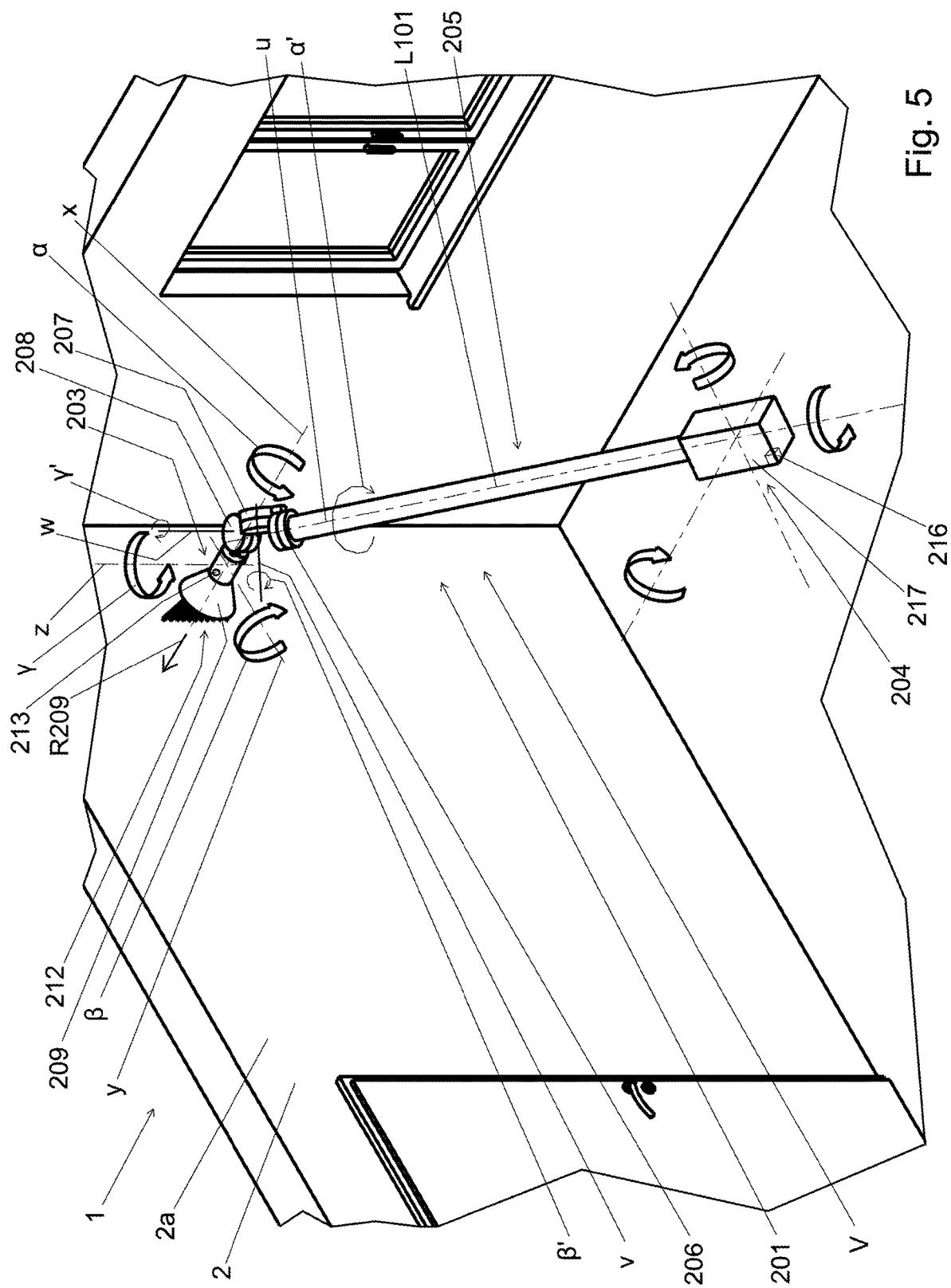
FIG. 5 shows a perspective view of the first space with a second embodiment variant (arranged therein) of a hand-held spray device which is held in a fifth position by the user (not illustrated).

FIG. 5 shows again a perspective view of the first space 1, wherein a second embodiment variant of a hand-held spray device 201 is held in the space 1 by a user (not illustrated) in a fifth position V. In contrast to the first embodiment variant of the spray device which is shown in FIGS. 1 to 4, in the second embodiment variant of the spray device 201 which is shown in FIG. 5, a single sensor 213 is not arranged in an operator control unit 204 or a connecting mechanism 205 of the spray device 201 but rather is arranged in front of all the swinging mechanisms 206, 207, 208 in the spraying direction R209, on a spray head 203. In the fifth position V, a spray nozzle 209 of the spray head 203 is then shown in a specified target orientation 212 with respect to the operator control unit 204 or with respect to a longitudinal axis L201 of the spray device 201. After programming of this target orientation 212, which is carried out, for example, by pressing a reset pushbutton key (not illustrated), the single sensor 213 senses as interference variables any swinging movement, generated by manual movement of the user, of the spray device 201 about an x axis detected by the sensor 213 and/or a y axis detected by the sensor 213 and/or a z axis detected by the sensor, in the form of an x swinging angle α about the x axis and/or a y swinging angle β about the y axis and/or a z swinging angle γ about the z axis, wherein the x, y and z axes are each positioned perpendicularly with respect to one another. This sensor data of the sensor 213 is transferred to a closed-loop control circuit 216 of a control device 217. This sensor data is converted by the closed-loop control circuit 216 into closed-loop control variables which are output in the form of a swinging angle α' about a u axis of a u swinging mechanism 206 and/or in the form of a swinging angle β' about a v axis of a v swinging mechanism 207 and/or in the form of a swinging angle γ' about an w axis of a w swinging mechanism 208, and are converted into a counter-swinging movement of the spray nozzle 209 by the u swinging mechanism 206 and/or the v swinging mechanism 207 and/or the w swinging mechanism 208, so that the target orientation 212 of the spray nozzle 209 is retained and the spraying direction R209 continues to be positioned perpendicularly with respect to a surface 2a of a vertical wall 2 of the space 1. In concrete terms, this means that a swinging movement carried out by the user (not illustrated) and directed to the left in the space 1 of the spray device 201, which the user grasps as shown in FIG. 1, brings about detection of a swinging movement about the z axis and leads to the compensation of corresponding rightward swinging of the spray head 3 about the z swinging axis z by actuation of the swinging mechanism 208.

For both embodiment variants of the spray device, it is the case that when there is a manual movement of the spray device which includes swinging movements about a plurality of axes, at least two of the swinging mechanisms are actuated in parallel, so that the target orientation of the spray nozzle is also retained during the manual movement.

The swinging mechanisms 106, 107, 108 of the first variant of the spray device 101 and the swinging mechanisms 206, 207, 208 of the second variant of the spray device 202 are embodied in FIGS. 1 to 5 as electrically operated swinging means in which an electric motor is arranged between two flange plates in each case. One embodiment variant provides that at least one of the swinging mechanisms and, in particular, all three swinging mechanisms comprise a joint, a force transmitting means and a drive, wherein the joint is driven by the drive with intermediate connection of the force transmitting mechanism, and wherein there is, in particular, provision that the joint is arranged between the connecting mechanism and the spray head, and the drive mechanism is arranged in the connecting mechanism or in the operator control unit. In particular, a cardan shaft or a flexible shaft or a cable pull or a toothed belt is provided as the force transmitting mechanism.

LIST OF REFERENCE SYMBOLS

1 First space
2 First, vertical wall
2a Surface of 2
3 Door in 2
4 Second, vertical wall
5 Window
6 Floor
7—not used—
8 Edge
9 Joint region between 2 and 4
21 Second space
22 First wall
23 Shelf floor
23a Upper side of 23
24 Surface of 23
51 User
52 First hand of 51
53 Second hand of 51
101 Spray device
102 Paint spray device
103 Spray head
104 Operator control unit
105 Connecting mechanism
106, 107, 108 u, v, w swinging mechanisms
109 Spray nozzle
110 Flat jet nozzle
111 Flat jet
112 Target orientation
113 Single sensor
114 Gyro sensor
115 Digital multi-axis gyro sensor
116 Closed-loop control circuit
117 Control device
118 Control buttons
119 Operator control mechanism
151 Supply device
152 Hose (paint)
153 Hose (air)

154 Cable
201 Spray device
203 Spray head
204 Operator control unit
205 Connecting mechanism
206, 207, 208 Swinging mechanisms
209 Spray nozzle
212 Target orientation
213 Sensor
216 Closed-loop control circuit
217 Control device
F Paint
GX Straight
L101, L201 Longitudinal axis of 101 and 201
M106-M108 Central rotational position
R109 Spraying direction of 109
R209 Spraying direction of 209
S107 Special rotational position
x, y, z x axis, y axis, z axis
u, v, w u swinging axis, v swinging axis, w swinging axis
α, β, γ Swinging angle about x, y, z
α', β', γ' Swinging angle about u, v, w
ε Angle between L101 and R109
I-IV First to fourth position of 101
V Fifth position of 201

The invention claimed is:

1. A hand-held paint spray device, comprising:
a spray head;
an operator control unit;
a connecting mechanism;
at least one swinging mechanism; and
a control device having a single sensor, the single sensor consisting of a digital gyro sensor that only detects (i) a z swinging angle about a z axis, which is orthogonal with respect to a longitudinal axis defined by the connecting mechanism, and (ii) a y swinging angle about a y axis, which is orthogonal with respect to the longitudinal axis defined by the connecting mechanism, and which is orthogonal with respect to the z axis,
wherein the spray head comprises a spray nozzle,
wherein the operator control unit comprises at least one operator control mechanism for controlling a flow of paint,
wherein the connecting mechanism connects the spray head and the operator control unit,
wherein the at least one swinging mechanism is arranged between the operator control unit and the spray nozzle,
wherein the spray nozzle pivots relative to the operator control unit, and
wherein the control device controls with the single sensor a manual rotation of the spray device causing a change in an orientation of the spray nozzle in space with respect to a target orientation of the spray nozzle, and corrects the change by the at least one swinging mechanism arranged between the operator control unit and the spray nozzle, such that the spray nozzle of the spray device is continuously adjusted to the target orientation that the spray nozzle had assumed before the manual rotation of the spray device.

2. The hand-held paint spray device as claimed in claim 1, wherein the single digital gyro sensor is arranged on the operator control unit or on the spray head and in a region of the spray nozzle.

3. The hand-held paint spray device as claimed in claim 1, wherein the connecting mechanism can be telescoped manually or automatically, and/or wherein the spray nozzle is a multi-purpose spray nozzle that can be switched between a flat jet and a round jet manually and/or automatically, and which can rotate manually and/or automatically, by at least one of the at least one swinging mechanism that are present, or by a rotation mechanism, which is present in addition to the at least one swinging mechanism, at least in 90° increments about a spraying direction.

4. The hand-held paint spray device as claimed in claim 1, wherein each of the at least one swinging mechanism comprises at least an electric drive or a pneumatic drive,
wherein the at least one electric drive or pneumatic drive is a rotary drive or a linear drive, and
wherein at least one of the spray nozzle, the spray head and the connecting mechanism can be swung directly or indirectly, and/or rotated directly or indirectly, by the at least one electric or pneumatic drive.

5. The hand-held paint spray device as claimed in claim 1, wherein the spray nozzle, the spray head, or the connecting mechanism can be swung out of a central rotational position by the at least one swinging mechanism,
wherein in the central rotational position, the spray nozzle is positioned such that the target orientation is parallel with respect to the longitudinal axis defined by the connecting mechanism, through a w swinging angle by rotation about the z axis to an unlimited extent with left-hand rotation and right-hand rotation, and can be swung through a v swinging angle by rotation about the y axis to an unlimited extent with left-handed rotation and right-handed rotation, and can also be rotated through a u swinging angle by rotation about the x axis to an unlimited extent with left-handed rotation and right-handed rotation.

6. The hand-held paint spray device as claimed in claim 1, wherein the paint spray device performs at least one of hydraulic paint spraying, pneumatic paint spraying, and electrostatic paint spraying.

7. The hand-held paint spray device as claimed in claim 1, wherein the spray device comprises a power supply for supplying energy to the control device and the at least one swinging mechanism,
wherein the power supply comprises an energy store,
wherein the energy store comprises at least one of an electrical accumulator and is accommodated in the operator control unit, a power line which is laid parallel to a paint hose or laid in a paint hose, and an electrical generator, and
wherein the electrical generator is driven by an air flow fed to the spray device or by a paint flow fed to the spray device by a turbine.

8. The hand-held paint spray device as claimed in claim 1, wherein the connecting mechanism comprises at least one lance tube, and
wherein the at least one lance tube is a carbon fiber component or a glass fiber component.

9. The hand-held paint spray device as claimed in claim 5, wherein in the central rotational position, the spray nozzle is positioned such that the target orientation is parallel with respect to the longitudinal axis defined by the connecting mechanism, through the w swinging angle by rotation about the z axis up to +/−30°, and can be swung through the v swinging angle by rotation about the y axis up to +/−30°, and can be rotated through the u swinging angle by rotation about the x axis up to +/−30°.

10. The hand-held paint spray device as claimed in claim 5, wherein in the central rotational position, the spray nozzle is positioned such that the target orientation is parallel with respect to the longitudinal axis defined by the connecting mechanism, through the w swinging angle by rotation about the z axis up to +/−45°, and can be swung through the v swinging angle by rotation about the y axis up to +/−45°, and can be rotated through the u swinging angle by rotation about the x axis up to +/−45°.

11. The hand-held paint spray device as claimed in claim 5, wherein in the central rotational position, the spray nozzle is positioned such that the target orientation is parallel with respect to the longitudinal axis defined by the connecting mechanism, through the w swinging angle by rotation about the z axis up to +/−180°, and can be swung through the v swinging angle by rotation about the y axis up to +/−180°, and can be rotated through the u swinging angle by rotation about the x axis up to +/−180°.

* * * * *